(12) United States Patent
Schmidt

(10) Patent No.: US 7,028,457 B2
(45) Date of Patent: Apr. 18, 2006

(54) THRESHING PLATE FOR A TAILINGS CONVEYOR OF AN AGRICULTURAL COMBINE

(75) Inventor: James R. Schmidt, Blue Grass, IA (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/740,099

(22) Filed: Dec. 18, 2003

(65) Prior Publication Data

US 2004/0137973 A1 Jul. 15, 2004

Related U.S. Application Data

(63) Continuation-in-part of application No. 10/340,263, filed on Jan. 10, 2003.

(51) Int. Cl.
*A01D 61/00* (2006.01)

(52) U.S. Cl. ............................. 56/16.6; 460/114

(58) Field of Classification Search ........ 460/107–110, 460/114; 99/519; 56/14.6, 16.6, 14.5
See application file for complete search history.

(56) References Cited

U.S. PATENT DOCUMENTS

| | | | |
|---|---|---|---|
| 298,196 A | 5/1884 | Gates | |
| 666,654 A | 1/1901 | Dingee | |
| 1,422,023 A | 7/1922 | Boe | |
| 2,457,257 A | 12/1948 | Michael et al. | |
| 2,715,404 A * | 8/1955 | Tillery | 460/110 |
| 2,771,077 A * | 11/1956 | Karlsson et al. | 460/108 |
| 2,875,768 A | 3/1959 | Belkowski et al. | |
| 3,038,476 A * | 6/1962 | Andersen | 460/76 |
| 3,247,855 A * | 4/1966 | Kepkay | 460/14 |
| 3,297,037 A * | 1/1967 | Ausherman | 460/107 |
| 3,651,814 A * | 3/1972 | Vander Zanden | 460/107 |
| 3,716,060 A * | 2/1973 | Suzue | 460/108 |
| 3,763,868 A * | 10/1973 | Khan | 460/59 |
| 3,945,178 A * | 3/1976 | Delfosse et al. | 56/14.6 |
| 3,976,084 A | 8/1976 | Weber | 130/27 R |
| 3,983,883 A * | 10/1976 | Ashton et al. | 460/85 |
| 4,312,365 A * | 1/1982 | Claas et al. | 460/62 |
| 4,362,168 A * | 12/1982 | Hengen et al. | 460/66 |
| 4,915,671 A * | 4/1990 | Johnson | 460/59 |
| 4,993,991 A * | 2/1991 | Yarmashev et al. | 460/66 |
| 5,376,047 A * | 12/1994 | Harden et al. | 460/121 |
| 5,613,907 A | 3/1997 | Harden | 460/109 |
| 6,234,072 B1 * | 5/2001 | Kooima et al. | 99/519 |
| 6,398,639 B1 | 6/2002 | Dammann et al. | 460/107 |
| 6,443,835 B1 | 9/2002 | Imel et al. | 460/107 |
| 6,669,558 B1 * | 12/2003 | Wolters et al. | 460/14 |
| 2002/0022505 A1 * | 2/2002 | Freeburn | 460/14 |

* cited by examiner

*Primary Examiner*—Árpád Fábián Kovács
(74) *Attorney, Agent, or Firm*—Rebecca Henkel

(57) ABSTRACT

A threshing plate installable in a housing of a tailings conveyor of an agricultural combine for causing threshing of a flow of tailings propelled through the housing by rotation of an impeller therein. The threshing plate can include a threshing surface having a wide variety of surface textures or characteristics for deflecting tailings propelled thereagainst back into the tailings flow in a turbulent manner so as to cause collision between the tailings resulting in the threshing action. The threshing plate can optionally be removable and reversible so as to provide different threshing characteristics.

17 Claims, 9 Drawing Sheets

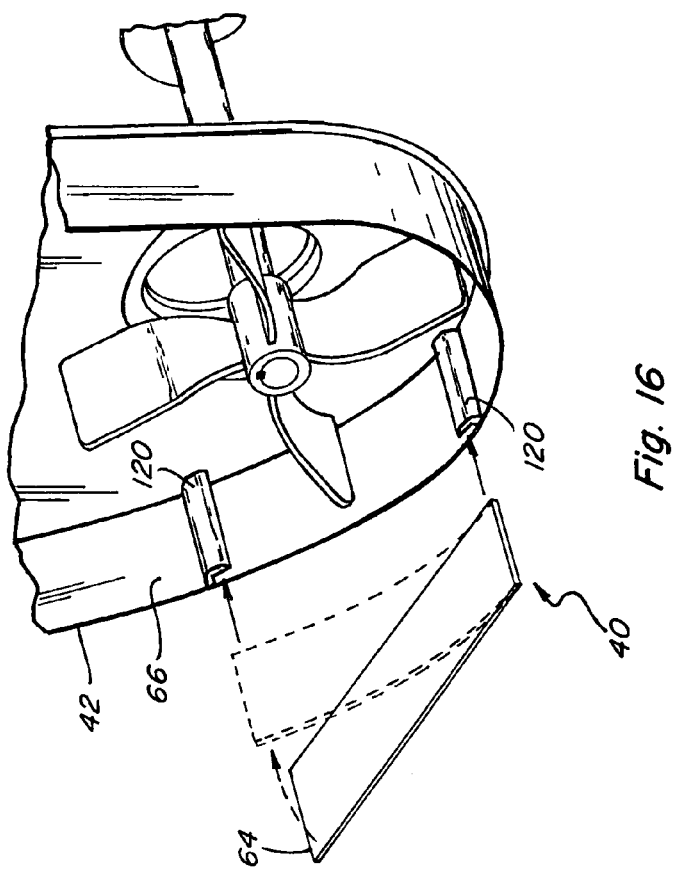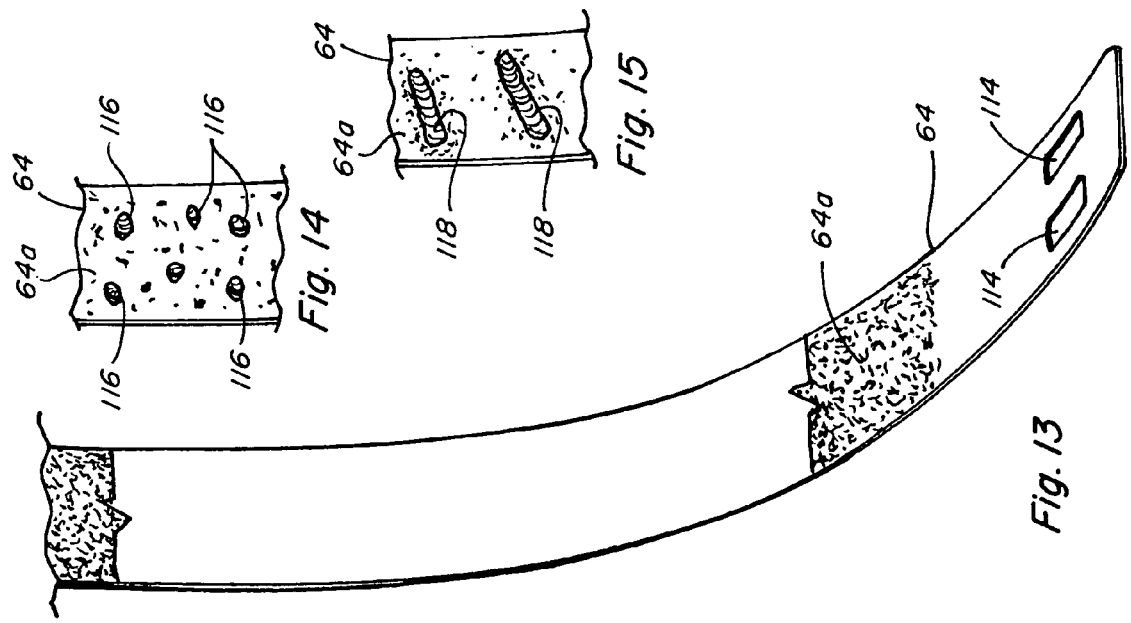

THRESHING PLATE FOR A TAILINGS CONVEYOR OF AN AGRICULTURAL COMBINE

This application is a Continuation-In-Part of U.S. patent application Ser. No. 10/340,263, filed Jan. 10, 2003.

BACKGROUND

This invention relates generally to an agricultural harvesting machine, and more particularly, to a threshing plate positionable in a tailings conveyor of a harvesting machine for causing tailings to be threshed as they are conveyed by the conveyor, which can be optionally reversible and replaceable with a replacement threshing plate providing different threshing characteristics.

Typically, an agricultural harvesting machine such as a combine gathers crop from a field and transports the crop by means of a feeder house to a threshing and separating device located inside the combine. Generally, threshing refers to removing grain, beans, seeds or kernels, hereinafter referred to as just grain, which are desired to be collected, from husks, cobs, pods, stems, and other portions of the plants being harvested, which are to be discarded. The threshing and separating device delivers the crop to the cleaning system of the combine, which includes a plurality of sieves. An upper sieve allows clean grain and some material other than grain (MOG) to fall through it, and a lower sieve is adjusted so that only clean grain is allowed to pass through it. The material including the clean grain and MOG that falls through the upper sieve, but does not pass through the lower sieve, is called tailings. In many cases it is desired for this material to be threshed and/or cleaned again.

Prior methods accomplish the threshing and/or cleaning of the tailings by conveying them to one side of the combine with an auger. The tailings are then carried by a conveyor, typically a paddle and chain conveyor, back to the combine threshing mechanism. Some combines have used a rethreshing device which is separate from the threshing system which helps save capacity on the threshing system by rethreshing the tailings separately from new crop coming into the combine. The auger feeds material into the rethreshing device and then the material is conveyed back to the cleaning system. Both single impeller/blowers and augers have been used to convey this material back to the cleaning system. These rethreshing devices are usually convertible, enabling the operator to manipulate the machine to be more or less aggressive, depending on the vulnerability of the grain to damage, during processing.

Prior methods for conveying the tailings material are inefficient in terms of throughput capacity and power consumption. Some known embodiments have resulted in large conveying devices that tend to limit access to both the combine and the conveying device for maintenance and conversion.

Therefore, what is needed is a more efficient means for conveying tailings, which overcomes many of the limitations and shortcomings set forth above, is more versatile, and can be adapted for providing a desired threshing function as the tailings are conveyed thereby.

SUMMARY

What is disclosed is a threshing plate for a tailings conveyor which provides a more efficient and versatile means for threshing tailings as they are conveyed through a portion or region of a tailings conveyor, which overcomes one or more of the limitations and shortcomings set forth above.

According to one aspect of the invention, a threshing plate installable in a housing of a tailings conveyor of an agricultural combine for causing threshing of a flow of tailings propelled through the housing by rotation of an impeller therein, is disclosed. The threshing plate includes a mounting portion removably mountable to the housing, and a threshing surface supported by the mounting portion so as to be positioned in predetermined relation to the impeller such that when rotated the impeller will propel at least a portion of the tailings against the threshing surface so as to be deflected thereby in a turbulent manner back into the tailings flow, such that at least a portion of the tailings are threshed by collisions between the tailings and with surfaces in the housing.

A resultant advantage is the ability to efficiently thresh the tailings as they are conveyed to another location in the combine, such that separate, bulky rethreshing apparatus is not required. Another advantage is the threshing by collisions between airborne tailings, which causes pod fragments, hulls and other common tailings to fracture and crack open to separate and release the grain with less resultant damage to the grain compared to mechanical and abrasive threshing methods. As another advantage, the threshing characteristics can be varied by varying the surface texture and other characteristics of the threshing surface.

According to a preferred aspect of the invention, the mounting portion can be mounted on the housing in at least two alternative orientations such that the threshing surface can be disposed in at least two corresponding orientations in the predetermined relation to the impeller. According to another preferred aspect of the invention, the impeller has a threshing portion which circumscribes an arc when the impeller is rotated and the threshing surface has a curve or arcuate shape marginally larger in curvature than the arc and is located radially outwardly of the arc when positioned in the predetermined relation to the impeller such that when the impeller is rotated the threshing portion will move along the threshing surface to propel the tailings thereagainst and therealong to produce the turbulence. The threshing plate can include two of the threshing surfaces on opposite sides thereof, and the threshing plate can be flexible such that the mounting portion can be mounted to the housing with a selected one of the threshing surfaces curved and positioned in the predetermined relation to the impeller. The threshing surfaces can have any desired features or surface texture for achieving a sought after threshing function, such as a smoother texture for deflecting the tailings in a first or less turbulent manner for providing less aggressive threshing, or a rougher texture for deflecting the tailings in a different or more turbulent manner for more aggressive threshing, and the threshing surface can include features such as one or more raised protuberances for randomly and turbulently deflecting the tailings in a still different manner.

As a result, versatility of the rethreshing of the tailings is improved. One or more of the threshing plates can be provided in association with one or more impellers in a conveyor. The threshing plates can have the same or different threshing characteristics. For instance, for a tailings conveyor including two or more impellers, a first or upstream one of the threshing plates can provide a more turbulent and aggressive threshing capability, and one or more downstream threshing plates can be less aggressive. More or less aggressive threshing plates can also be used as required or desired for different crops. Efficiency is improved as the tailings are rethreshed as they are conveyed back to the cleaning system or other desired location on the combine.

BRIEF DESCRIPTION OF THE DRAWINGS

FIG. 13 is a fragmentary perspective view of a threshing plate including one alternative threshing surface including a plurality of raised beads thereon.

FIG. 14 is a fragmentary perspective view of a threshing plate including a threshing surface composed of weld beads and splatter.

FIG. 15 is a fragmentary perspective view of another alternative threshing plate including a threshing surface composed of elongate weld beads and splatter.

FIG. 16 is a fragmentary perspective view of the tailing conveyor housing with the front cover removed to illustrate installation of a flexible threshing plate therein.

DETAILED DESCRIPTION OF THE PREFERRED EMBODIMENTS

Figure 1:
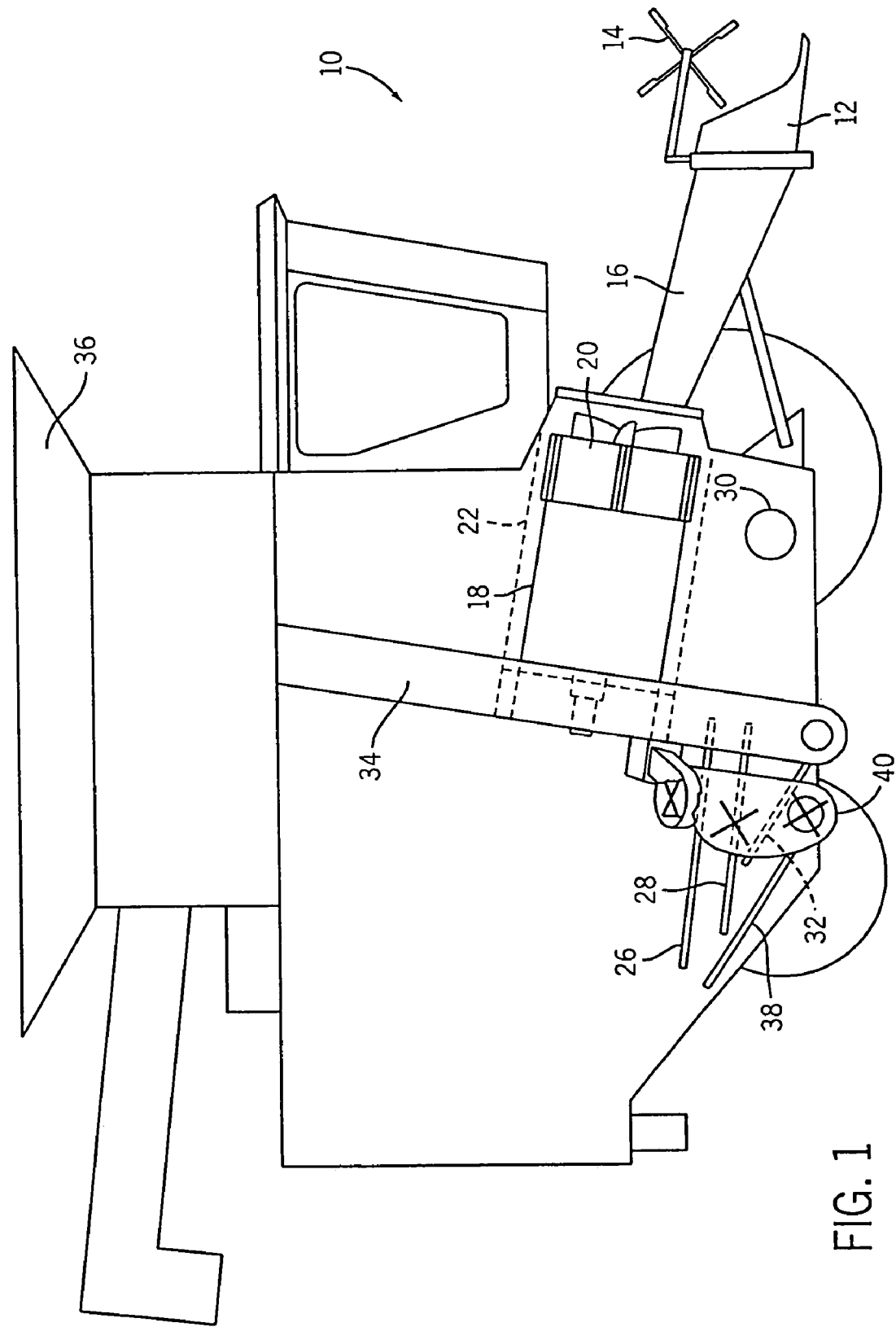
FIG. 1 is a simplified side view illustrating an embodiment of the major components of an agricultural harvesting machine.
Figure 2:
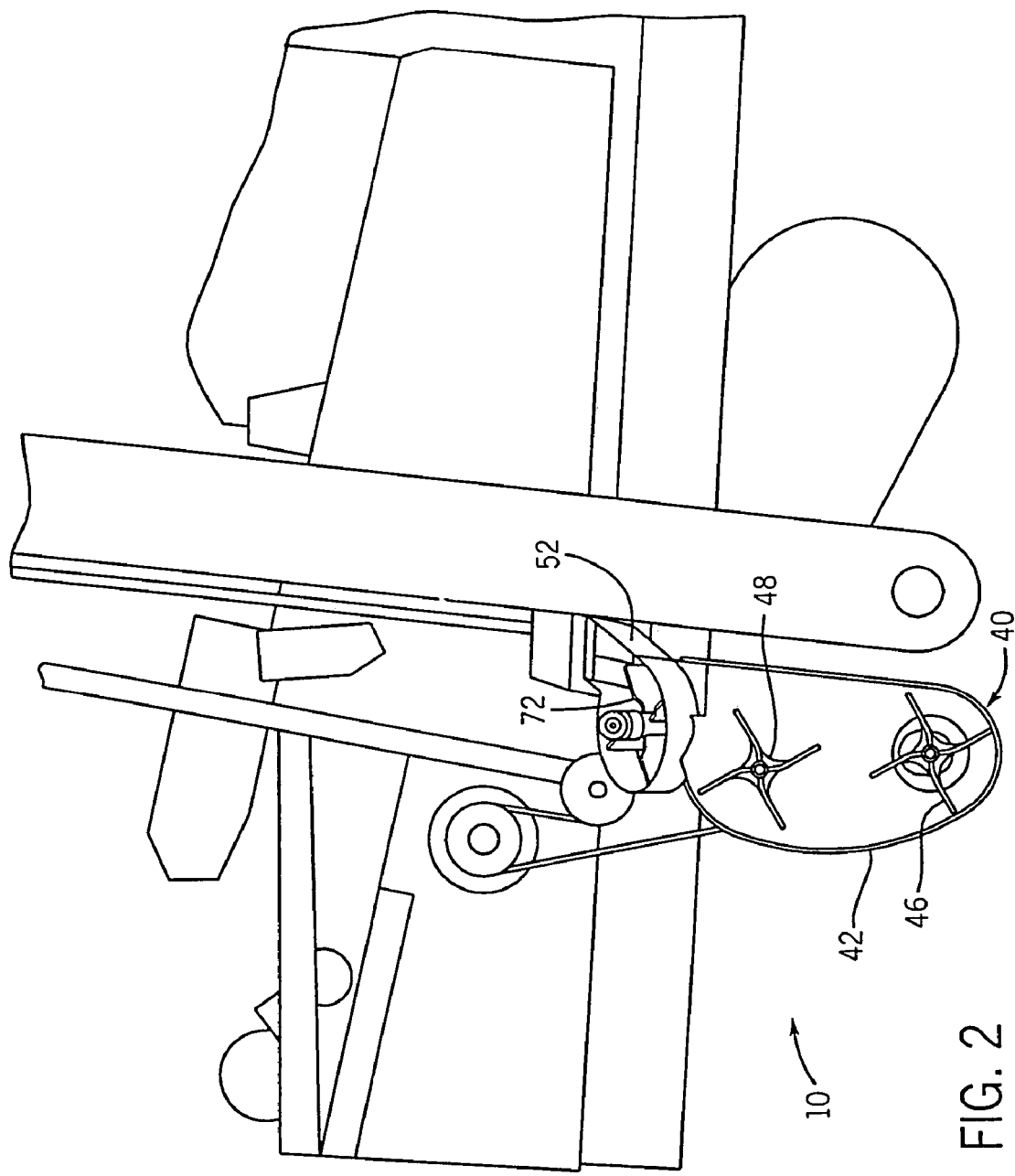
FIG. 2 is a more detailed view of the harvesting machine of FIG. 1 depicting an embodiment of a tailings conveyor within the machine with a front cover of the conveyor removed to show internal aspects thereof.

Referring to FIG. 1, an agricultural harvesting machine 10, incorporating the principles of the instant invention, has a header 12, a reel 14, and a feeder 16. Crop material is collected by header 12 and reel 14 and taken into agricultural harvesting machine 10 through feeder 16 in a conventional manner.

A threshing assembly 18 includes a rotor 20 and a perforated housing 22. Rotor 20 is rotated within perforated housing 22. Crop is received from feeder 16 and is passed through clearances between rotor 20 and perforated housing 22 to thresh grain. Grain which is threshed in the clearances between housing 22 and rotor 20 falls through the perforations in housing 22 and is transported to a cleaning system 24 including a chaffer sieve 26 and a shoe sieve 28. Chaffer sieve 26 and shoe sieve 28 are members that oscillate back and forth. Sieves 26 and 28 have a plurality of apertures for allowing the properly threshed grain to fall through. A blower 30 blows air through sieves 26 and 28 and out the rear of agricultural harvesting machine 10. Chaff will be blown outward along with the air. The clean grain falls through sieves 26 and 28 onto an inclined plane 32. Clean grain travels along plane 32 and then through a grain elevator 34, to a grain storage area 36.

Grain and material other than grain (MOG), which is too heavy to become air borne and falls through chaffer sieve 26 but does not pass through shoe sieve 28 is commonly known as tailings. Tailings end up on a plane 38 and are rethreshed and conveyed in a tailings conveyor 40 and discharged from tailings conveyor 40 onto chaffer sieve 26.

As in best seen in FIGS. 2–6, tailings conveyor 40 includes a housing 42 including an interior portion 43; a first opening 44 communicating with interior portion 43; a first rotary impeller 46 and a second rotary impeller 48 located in interior portion 43; and a second opening 50 communicating with interior 43 and a conduit 52. A third impeller 72 is located in conduit 52. The first and second impellers 46 and 48 are each rotated in predetermined rotational directions A on shafts 58 and 51, respectively, about substantially parallel rotational axes C and D extending longitudinally through the centers of shafts 58 and 51, respectively. The third impeller 72 may rotate in the opposite direction or as alternative in the same direction as the bottom two impellers 46 and 48.

Figure 3:
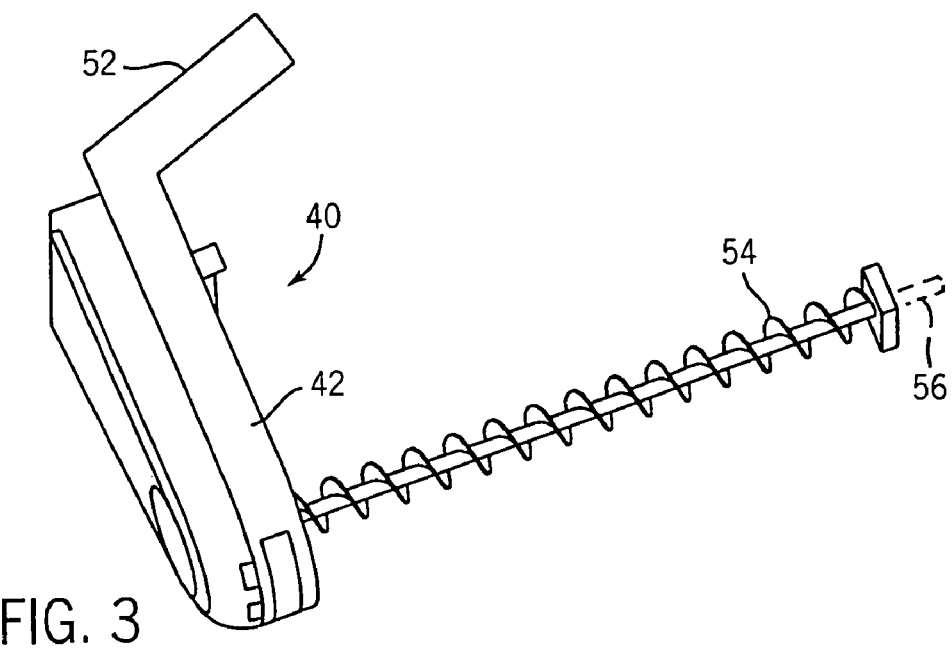
FIG. 3 is a perspective view of an embodiment of the conveyor of FIG. 2 in association with a feed auger of the machine for feeding tailings to the conveyor.
Figure 4:
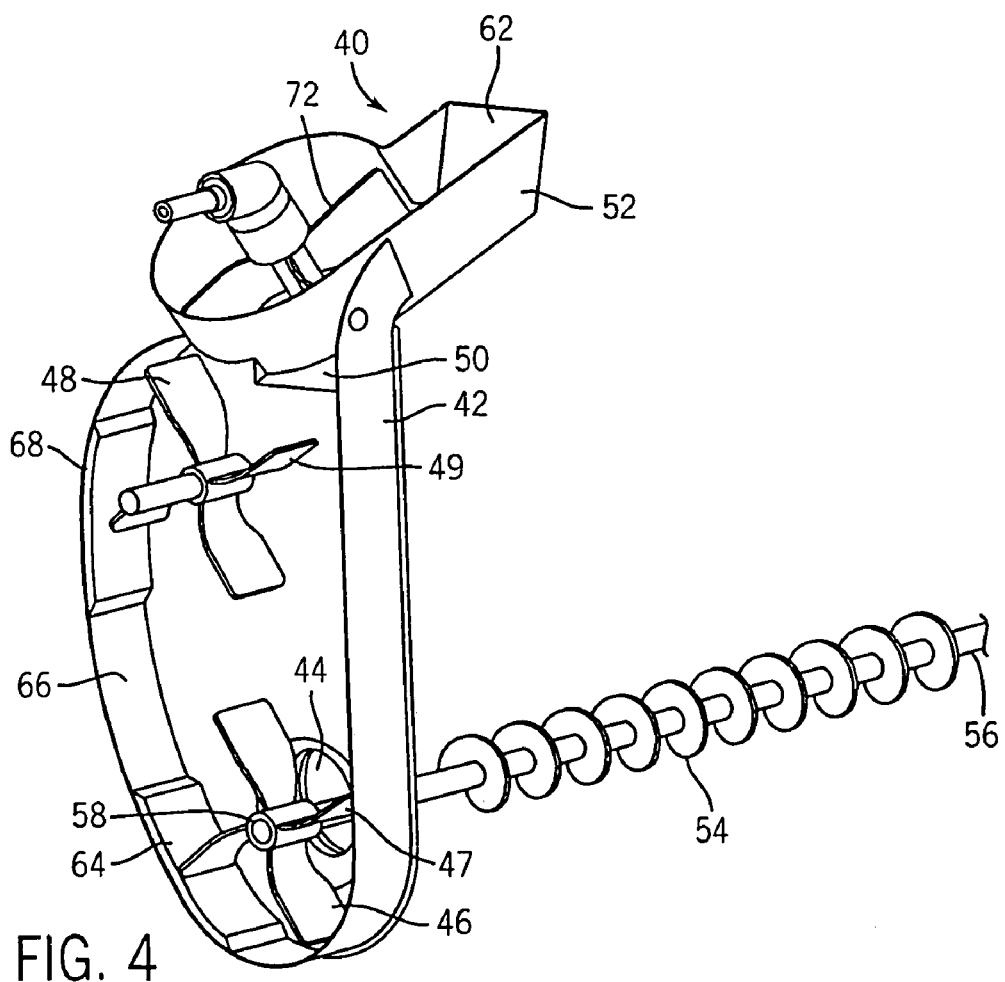
FIG. 4 is a simplified perspective view of the tailings conveyor of FIG. 2, showing embodiments of threshing plates of the invention.
Figure 5:
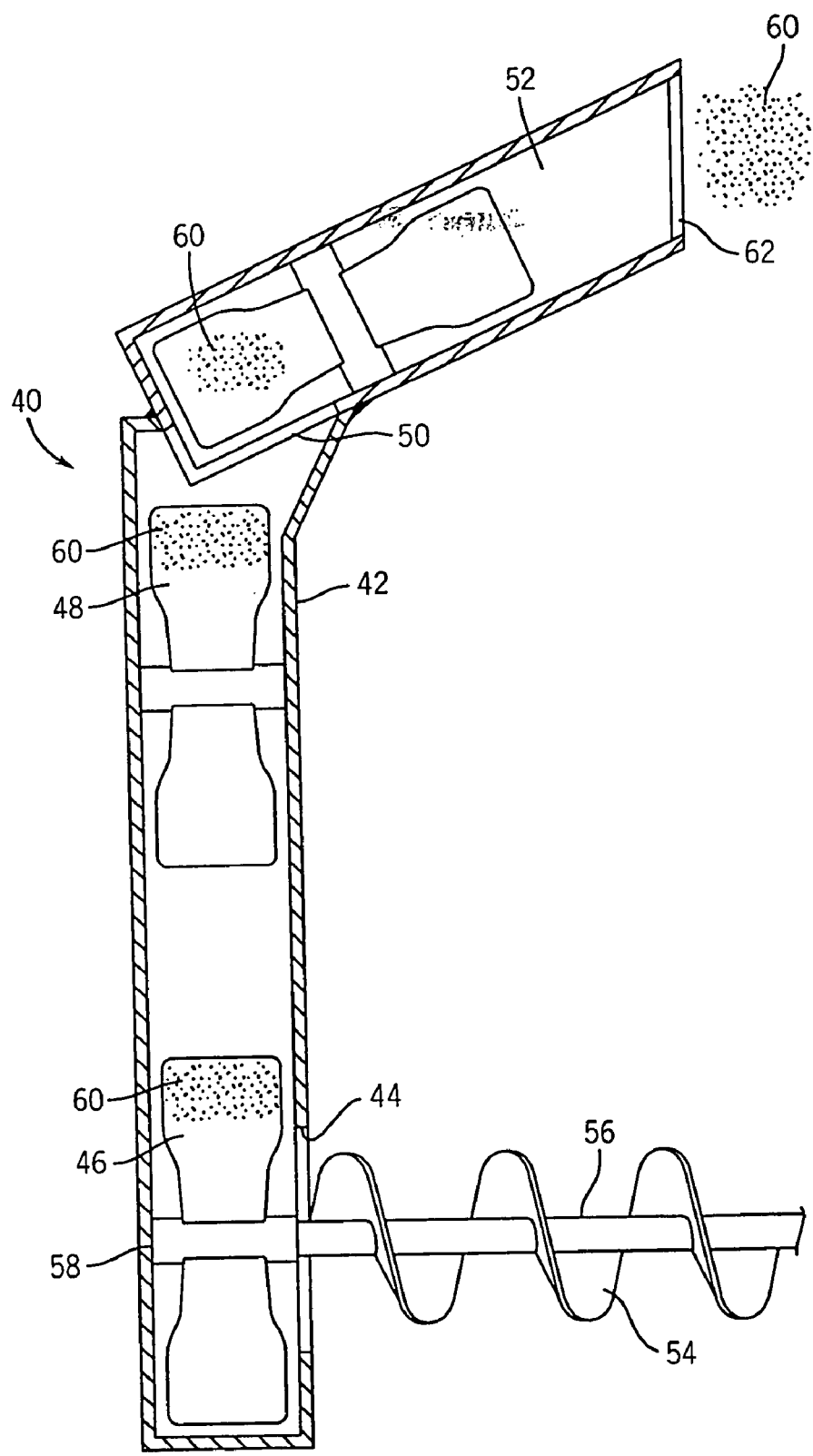
FIG. 5 is a simplified perspective view of the tailings conveyor taken along line 5—5 of FIG. 4.

Housing 42 receives the tailings through first opening 44 by means of a conventionally constructed and operable auger 54, as depicted in FIG. 3. Auger 54, as shown FIGS. 4, 5 and 6, rotates about rotational axis C on a shaft 56 coaxial with shaft 58 for moving the tailings toward tailings conveyor 40, such that the tailings will be discharged by auger 54 through first opening 44 into interior portion 43 of housing 42 in a position to be propelled by rotating first impeller 46 through interior portion 43 to second impeller 48. As an alternative, first opening 44 can be offset from the shaft 58, such as depicted at 44a in FIG. 6, so that, for instance, tailings 60 are delivered into housing 42 at a lower location or more in the vicinity of the radial outer portion of first impeller 46.

First impeller 46, second impeller 48, and third impeller 72 each include a plurality of blades 47 extending generally radially outwardly relative to the rotational axis of the respective impeller. Each of the blades 47 is preferably curved or arcuate so as to have a concave surface 47a facing oppositely of the rotational direction A, and a convex surface 47b facing forwardly in or toward the rotational direction A, such that each blade 47 is swept back relative to the rotational direction A, as best shown in FIG. 6.

The impellers 46, 48 and the second opening 50 are preferably radially in-line or aligned, such that tailings 60 which enter housing 42 at opening 44, or 44a, are propelled in rotational direction A by first impeller 46 along a radially inwardly facing threshing surface 64a of a first threshing plate 64, and into the path of rotation of radially adjacent second impeller 48, as denoted by large arrow B. Second impeller 48 will then propel tailings 60 in direction A along a radially inwardly facing threshing surface 68a of a second threshing plate 68, and through second opening 50 into conduit 52 into the path of rotation of third impeller 72, as also denoted by a large arrow B. Third impeller 72 will then propel tailings 60 through conduit 52, again as denoted by a large arrow B, so as to exit through a discharge outlet 62, so as to be spread over a predetermined region of chaffer sieve 26, or another location if desired. In interior portion 43 of housing 42, a radially inwardly facing common housing wall 66 guides and enhances the radial direction of travel of tailings 60 from first impeller 46 to second impeller 48. In conduit 52, a third threshing plate 80 can be provided having a radially inwardly facing threshing surface (not shown) for facilitating threshing by third impeller 72, and for guiding the tailings flow to conduit 52.

The preferred rotational direction A for both of impellers 46 and 48 is clockwise. The preferred rotation of impeller 72 is counterclockwise, however clockwise will also suffice. The curved or arcuate or swept back shape of blades 47 of impellers 46, 48 and 72 has been found to cause a more aggressive threshing of tailings 60 and forces the tailings 60 to the radially outer portion of the blades 47 faster, which has been found to increase conveying capacity. Threshing plate surfaces 64a, 68a and 80 may each have a rough surface texture or smooth, and/or can include elements such as raised protuberances and the like, for imparting a desired turbulence to the tailings flow, for performing a desired threshing function, as discussed in more detail below.

Figure 6:
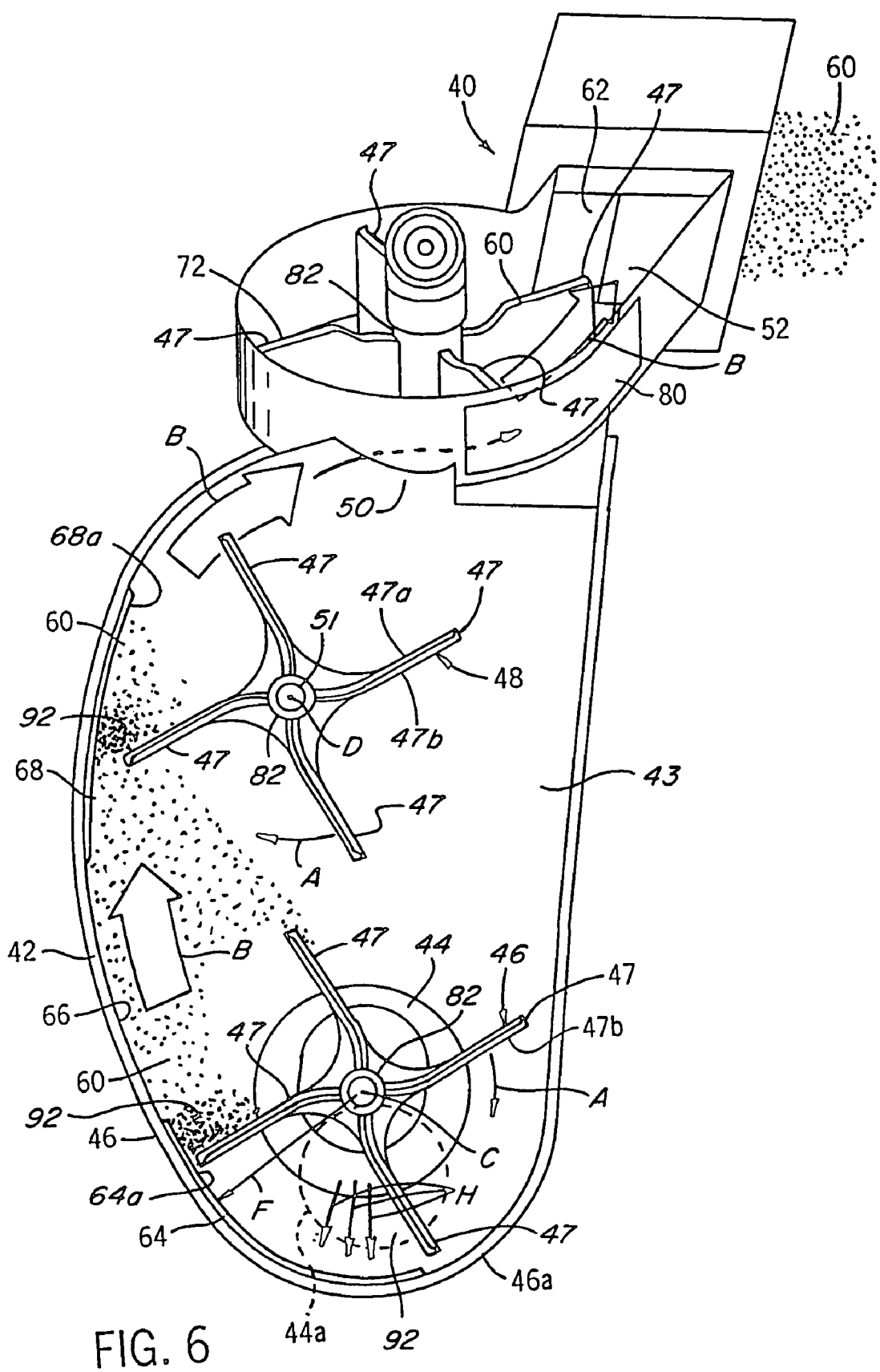
FIG. 6 is a frontal view of the tailings conveyor housing of FIG. 2 with the front cover removed and illustrating tailings being conveyed through the conveyor in a turbulent manner as a result of contact with the threshing plates.
Figure 7:
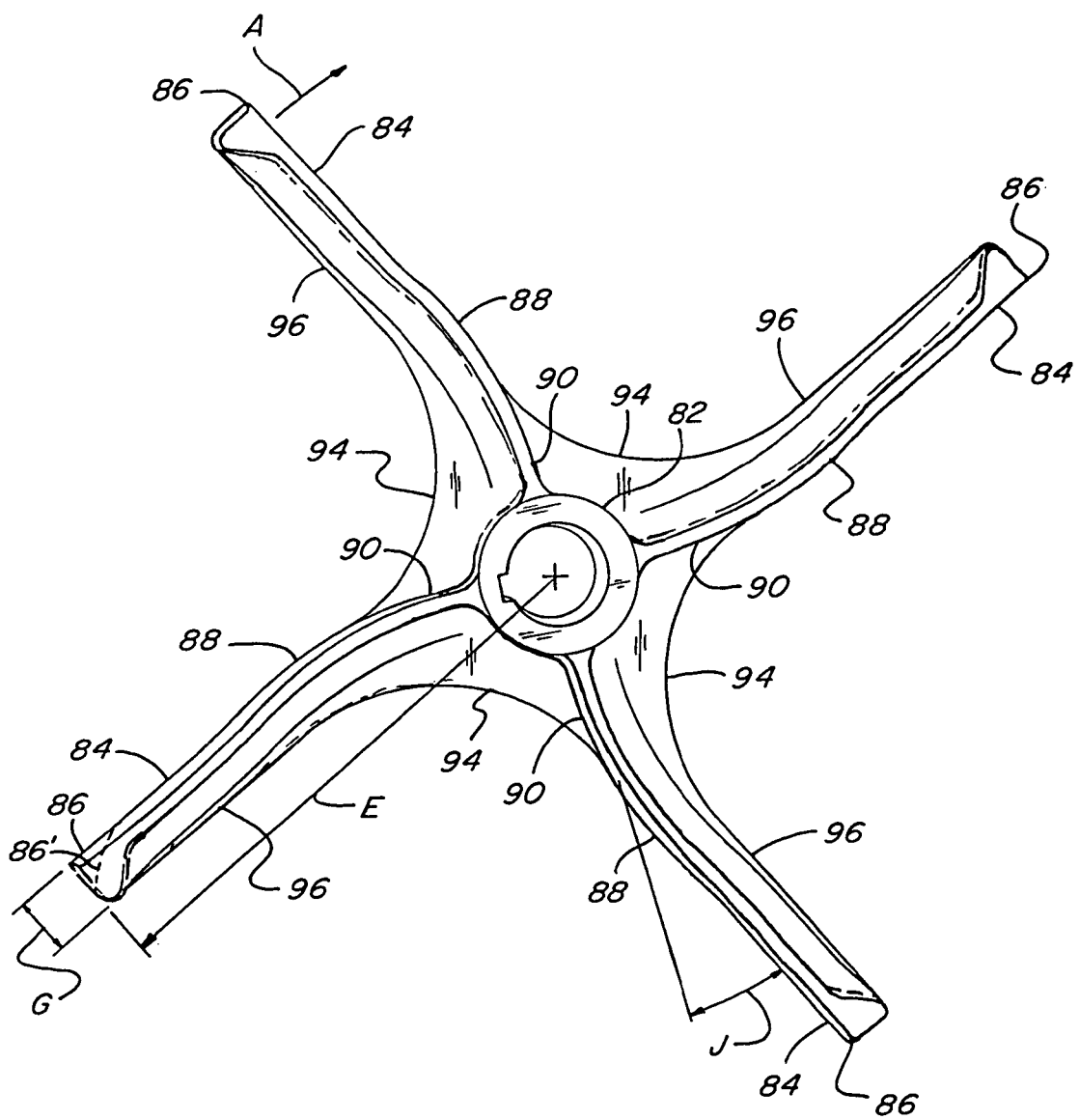
FIG. 7 is a frontal view of an impeller of the tailings conveyor for propelling the tailings through the conveyor housing.
Figure 8:
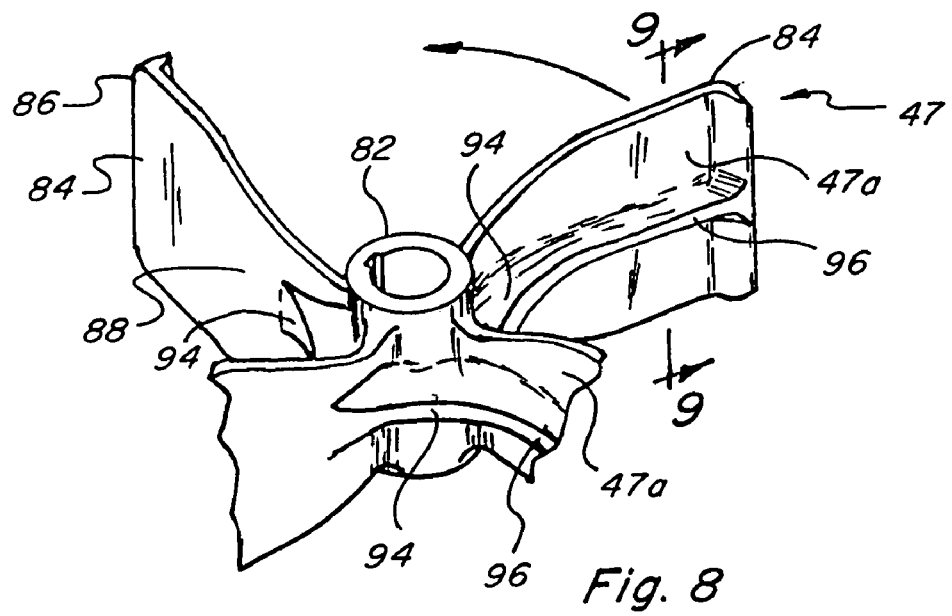
FIG. 8 is a fragmentary perspective view of one of the impellers.
Figure 9:
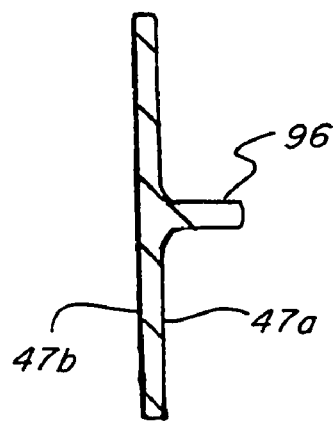
FIG. 9 is a sectional view along line 9—9 of FIG. 8.
Figure 10:
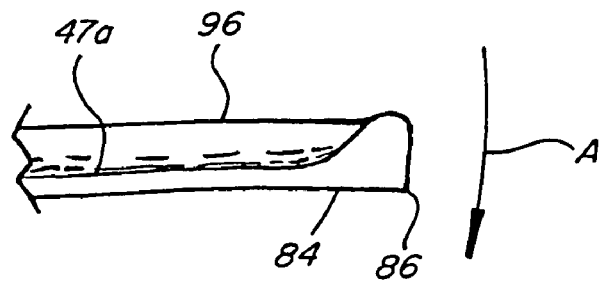
FIG. 10 is a fragmentary front view of a blade of one of the impellers, showing an extent of a radially outermost portion thereof in a rotational direction thereof.

Impellers 46, 48 and 72 each includes a mounting portion 82 which is preferably a hub, mountable to a rotatable member, such as shaft 58 of conveyor 40 in the instance of impeller 46, for rotation with the rotatable member in a predetermined rotational direction, such as direction A, about a rotational axis, such as axis C, as best shown in FIG. 6. Each impeller 46, 48 and 72 includes a plurality of blades 47, preferably four in number, which extend generally radially outwardly from mounting portion 82 at equally spaced locations around the rotational axis. As noted before, each blade 47 includes a surface 47a facing in a direction opposite the rotational direction, and a surface 47b facing in the rotational direction.

Referring also to FIGS. 7, 8, 9 and 10, a preferred embodiment of first impeller 46 is shown, which is also representative of preferred impellers 48 and 72 in both construction and operation. Surface 47b of each blade 47 of impeller 46 includes a radially outermost threshing portion 84 facing in rotational direction A and terminating at a radially outermost tip portion 86, and a tailings deflecting portion 88 which generally encompasses the convex region of the blade between threshing portion 84 and mounting portion 82. In operation, as tailings 60 are inducted into interior portion 43 of housing 42 through opening 44 or 44a, elements of the tailings, which will generally include some individual loose grain, grain partially or fully contained in pods or pod fragments, small straw pieces, pod fragments, and other plant fragments, will be impacted by surface 47b and propelled or driven in direction A. In this context, it has been found that as a result of the convex shape of deflecting portion 88 of each blade, tailings 60 impacted thereby will be propelled or driven generally tangentially radially outwardly and forwardly, as illustrated by arrows H in FIG. 6, into the path of threshing portions 84 of blades 47. This will occur in a relatively turbulent manner, such that the individual tailings will collide randomly with each other and with threshing portion 84, and also with threshing surface 64a. As a result, at least some of the pods and pod fragments containing grain will be broken open to release the grain therefrom, for eventual cleaning or separation from the MOG in the cleaning system.

To facilitate or accentuate this threshing action, each blade 47 has a predetermined radial extent E as measured from the center of mounting portion 82 to tip portion 86 of the blade, which is a predetermined amount less than a predetermined minimum radial distance F from rotational axis C to threshing surface 64a (FIG. 6). As a result, the spacing between tip portions 86 of the blades and surface 64a can be controlled, as desired or required for a particular application. In this regard a wide range of spacings can be utilized. For instance, a non-limiting representative range of spacings is from as little as about 1 mm to 2.5 mm or larger, it being mainly desired that the tailings will be carried or driven by tip portion 86 over surface 64a in a turbulent manner and as a result will roll and tumble along surface 64a and be otherwise agitated so as to collide with the other tailings and threshing surfaces 64a and 84, and tip portion 86, such that at least some portion of remaining intact pods and other grain holding plant fragments will be broken open to release the grain therefrom.

As another result of the movement and action set forth above, some of the tailings, which have some abrasive properties, will pass and/or be dragged through the space between surface 64a and tip portion 86, such that wear of the affected surfaces will occur with use, particularly surface 64a and the surfaces of tip portions 86 facing in direction A. To maintain the radial length of blades 47 and provide desired impeller effective life under anticipated wear conditions, tip portions 86 each preferably have a predetermined thickness or extent G in direction A which is greater compared to the extent of most other portions of blade 47 in direction A. As a result, even as tip portion 86 wears or abrades away, as illustrated by dotted line 86' in FIG. 7, the radial extent E of blade 47 will remain substantially the same. Wear of tip portion 86 in a rearwardly curving manner such as illustrated at 86' is even contemplated to improve threshing function under some conditions. Also, threshing plate 64, or at least the portion thereof including threshing surface 64a, is preferably removable and replaceable and/or reversible.

As a result of the convex shape of deflecting portion 88 of the blades 47, threshing portion 84 is preferably swept back or extends more rearwardly relative to deflecting portion 88 in respect to rotational direction A, that is, oppositely to direction A, such that at least a portion of the deflected tailings are propelled forwardly of and into the path of threshing portion 84. Here, threshing portions 84 of blades 47 are shown swept back at an angle J of preferably about 30 degrees relative to a radial innermost portion 90 of each blade 47 extending between deflecting portion 88 and mounting portion 82, which has been found to be effective for a range of contemplated rotational speeds and grains. This swept back configuration, in combination with threshing surface 64a defines a space 92 forwardly of threshing portion 84 of each blade 47 in direction A (FIG. 6) where much of the above discussed turbulence and resultant threshing action takes place. The swept back configuration also facilitates accelerating and shedding of the tailings off of tip portions 86 of the blades after passing surface 64a, so as to be propelled toward second impeller 48.

Impeller 46 additionally includes radially outwardly extending webs 94 around mounting portion 82 connecting adjacent ones of blades 47, and ribs 96 extending radially outwardly from webs 94 along surfaces 47a for strengthening blades 47.

Here, it should be noted that although it is contemplated that second impeller 48 and third impeller 72 will be constructed the same and operate essentially the same as first impeller 46, it should also be noted that impellers 48 and 72 could be constructed differently, as required for providing different operating characteristics, as desired or required.

Figure 11:
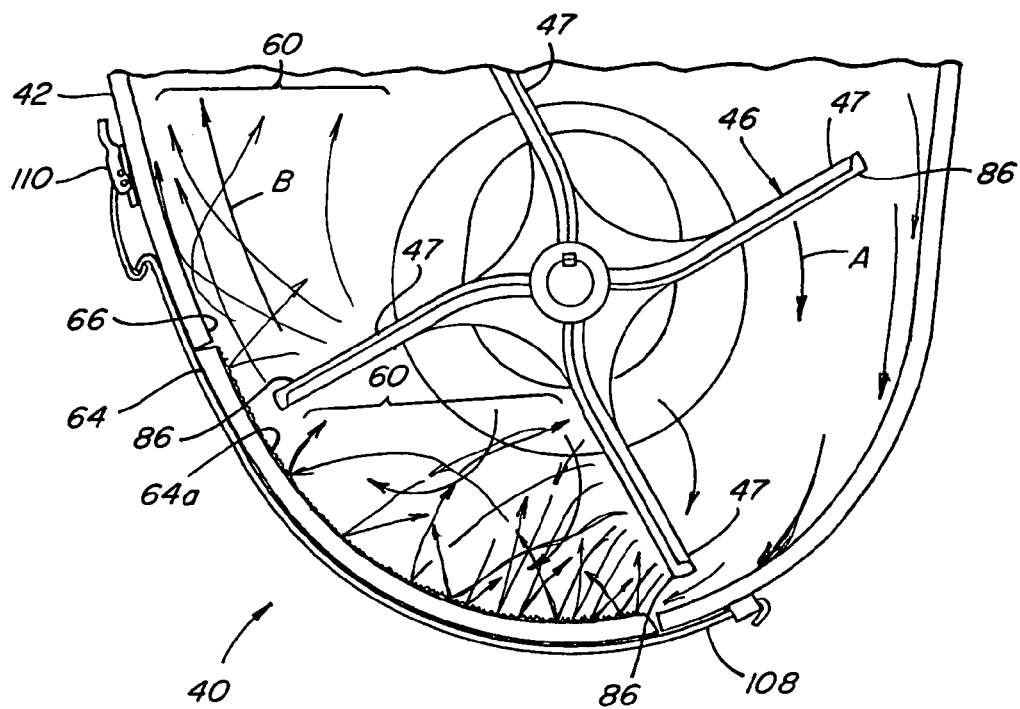
FIG. 11 is a fragmentary frontal view of the tailings conveyor housing of FIG. 2 with the front cover removed and illustrating one surface texture for the threshing surface of the threshing plate and turbulent deflection of the tailings thereby during rotation of the impeller.

FIG. 11 illustrates the turbulence imparted to tailings 60 of tailings flow B as a result of being propelled by blades 47 against one representative threshing surface 64*a* of threshing plate 64, by the rotation of blade 46 in the direction A. Here, surface 64*a* is composed of surface features including closely spaced, overlapping and/or abutting raised beads of weld splatter deposited by striking surface 64*a* with an electrified welding rod of an arc welder. It should be noted, however, that the surface features of surface 64*a* can be composed of a wide variety of elements and materials for providing a desired or required turbulence and tailings collisions and resulting threshing function, and can be integrally formed with or on plate 64, and/or can be applied or mounted or held thereon in any suitable desired manner. Plate 64 and surface 64 can also have any desired shape or combination of shapes, such as a generally rounded shape, or an angular shape having surface portions oriented at different angles, as desired or required for cooperative action with impeller 46 for obtaining desired or required turbulence and threshing action. Here, it can also be noted that threshing plate 64 has a generally curved or arcuate shape marginally larger than the arc circumscribed by tip portions 86 of blades 47 (distance E in FIG. 7). As a result, tailings will be deflected in a predictable and desired manner by surface 64*a* into the path of blades 47 and thus into tailings flow B, so as to collide with the other tailings thereof such that remaining pod fragments, cob fragments, husks, and other elements of the tailings containing grain will be fractured or broken to release the grain therefrom for achieving the desired threshing function. Here also, it can be noted that threshing plate 64 is mounted to or is part of a curved inner surface of an access door 108 of housing 42, which is removably secured in position by a suitable holding device or element such as an over center clamp 110, or one or more commercially or commonly available clamps, latches and/or fasteners in the well known manner.

Figure 12:
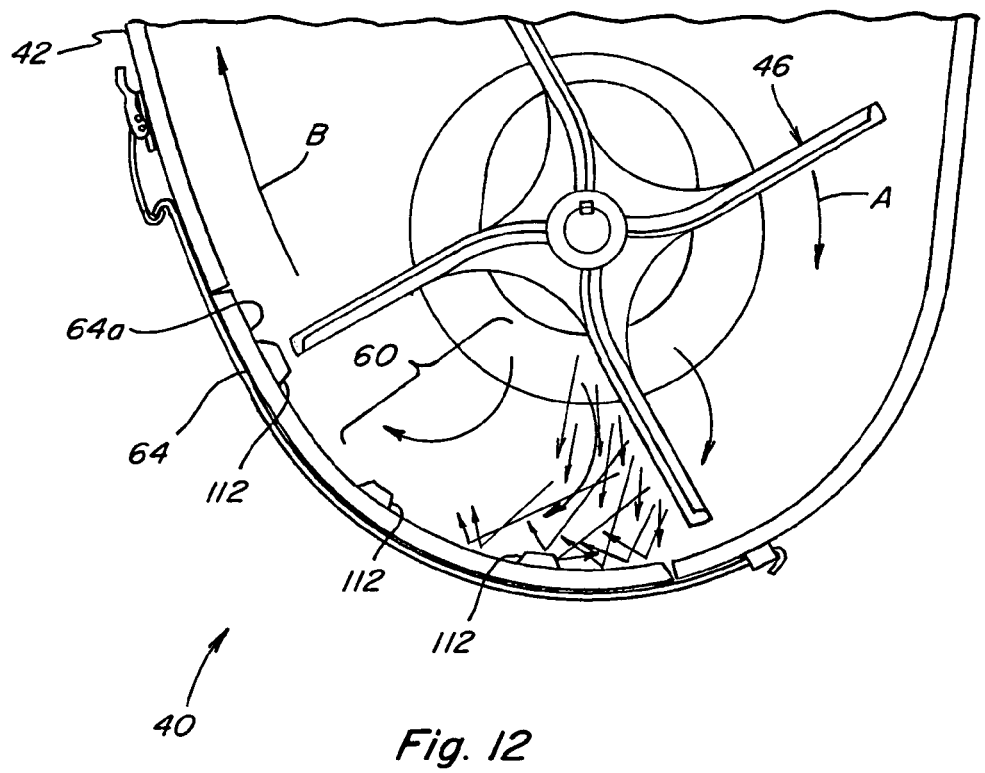
FIG. 12 is another fragmentary frontal view of the tailings conveyor housing of FIG. 2 with the front cover removed showing the threshing plate with a different threshing surface and illustrating deflection of the tailings thereby.

Referring also to FIG. 12, housing 42 of tailings conveyor 40 is shown with threshing surface 64*a* of threshing plate 64 including alternative surface features composed of a plurality of spaced, raised protuberances 112 thereon. Here, as impeller 46 is rotated in direction A, tailings 60 of tailings flow B will be propelled against surface 64*a* and protuberances 112, so as to be deflected thereby in a turbulent manner so as to collide with other tailings of tailings flow B such that pod and cob fragments, husks and the like containing grain are fractured and broken apart to release the grain in the above-described manner for achieving a desired threshing function.

FIG. 13 shows surface 64*a* of threshing plate 64, illustrating a possible density and randomness of the layer of weld splatter of FIG. 11, which is representative of one possible rougher surface texture that can be provided on surface 64*a*. Holes 114 are also shown through one end of plate 64, to provide a location for insertion of bolts, clips, tabs, or other elements usable for fastening or mounting plate 64 on access door 108 or any other desired surface within housing 42. Plate 64 can also be welded, fastened or adhered directly onto any desired interior surface of the housing, as desired or required for a particular application.

FIG. 14 shows surface 64*a* of threshing plate 64 including another alternative surface texture, which includes a plurality of spaced apart raised beads 116, as well as some weld splatter.

FIG. 15 shows surface 64*a* of threshing plate 64 including still another alternative surface texture, here including a plurality of spaced apart raised, elongate weld beads 118, as well as some weld splatter.

Plate 64 can be made in a wide variety of ways, can be rigid or flexible, and can be made of a wide variety of materials, including but not limited to, sheet or plate metal such as cast or wrought iron, steel or aluminum, or plastics. The surface features or elements that compose surface 64*a* can be integrally formed or manufactured such as, but not limited to, by molding, casting, sintering, or powder forming, or applied as a surface coating such as by the above discussed welding, or the elements can be sprayed on such as by application of a roughened or gritty coating, or manufactured on the surface such as by machining, abrading, cutting, etching, blasting, peening, knurling and/or other surface treatment techniques or adhered or otherwise securely held on plate 64. An exemplary spray on surface coating is the commercially available Rhino brand polyurethane truck bed coatings available from Rhino Linings USA, Inc., of San Diego, Calif. USA. Other similar spray on and roll on coatings are also well known and commercially available. The surface features can also be composed of individual items or a number of items that are fastened or otherwise suitably supported on an inner surface of housing 42. As a result, it should be apparent that it is contemplated that surface 64*a* can have any of a wide variety of elements thereon providing a surface texture for providing a desired tailings deflection and resultant threshing characteristic. The elements of the surface texture can have irregular or multiple angularly related surfaces oriented so as to face into different directions and have sharp edges, and can include a combination of smooth surface areas and raised protuberances, such as protuberances 112, rounded weld beads 116, and elongate beads 118. Other surface texture characteristics, such as recessed pits, grooves, and the like, can also be used, as required or desired for achieving the threshing function or aggressiveness sought. One advantage of using weld beads and splatter is that welders are common appliances in agricultural operations, and the surface texture of surface 64*a* can thus be repaired or altered conveniently and easily, as desired. As an example, welded surface features can be fully or partially removed such as by grinding and new features added or existing features modified by welding. Others of the surface features can also be altered or modified for providing a desired threshing function. For instance, the protuberances 112 can be removable or changeable so as to be variable in height, width and/or shape for providing a desired threshing function.

Turning to FIG. 16, as an example of a contemplated alternative construction for threshing plate 64 is shown. Here, threshing plate 64 is illustrated as a member of sheet or plate metal or other material such as plastics, which can be optionally flexible, as illustrated in dotted lines, and insertable and holdable in place by suitable elements, such as clips 120 located in spaced, opposing relation on surface 66 of housing 42 of conveyor 40. Plate 64, if flexible, can be flexed for insertion into position between clips 120, or if rigid and curved, merely slid between clips 120 to be held in position thereby. Here, it should be noted that plate 64 can be secured in position in any of a variety of manners, using common fasteners, welding, clamps, clips, adhesives, backing plates and the like.

It should also be noted that the discussion above referring to threshing plate 64 and threshing surface 64*a* in FIGS. 11–16 is equally pertinent to threshing plates 68 and 80 and the threshing surfaces thereof. As an example, it is contemplated that threshing surface 64a of threshing plate 64 could have a rougher surface texture, to provide a more aggressive threshing function, whereas the threshing surfaces of threshing plates 68 and 80 could have less rough or smoother surface textures, to provide a less aggressive threshing function.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A threshing plate installable in a housing of a tailings conveyor of an agricultural combine for causing threshing of a flow of tailings propelled through the housing by rotation of an impeller therein, comprising:
    a mounting portion removably mountable to the housing; and
    two threshing surfaces supported by the mounting portion on opposite sides thereof, the two threshing surfaces comprising a surface texture including non-bladed, non-cutting surface portions facing in a plurality of directions, at least one of the two threshing surfaces positioned in predetermined relation to the impeller, the impeller having a radial outer threshing portion which circumscribes an arc when the impeller is rotated, the mounting portion being mountable on the housing in at least two alternative orientations such that at least one of the two threshing surfaces can be disposed in at least two corresponding orientations in the predetermined relation to the impeller, the threshing plate being flexible such that the mounting portion can be mounted to the housing with a selected one of the threshing surfaces having the arcuate shape and being in predetermined relation to the impeller, the arcuate shape being marginally larger in diameter than the arc circumscribed by the impeller and being located radially outwardly of the arc when positioned in the predetermined relation to the impeller such that when the impeller is rotated, the threshing portion will move along the threshing surface to propel at least a portion of the flow of the tailings against one of the two threshing surfaces such that the at least a portion of the flow of tailings is deflected away from the threshing surface in a turbulent manner into the flow of the tailings such that the tailings will be at least partially threshed by random collisions therebetween, wherein a first of the threshing surfaces has a first surface texture for deflecting the tailings in a first turbulent manner and a second of the threshing surfaces has a second surface texture rougher than the first surface texture for deflecting the tailings in a second turbulent manner different from the first turbulent manner.

2. The threshing plate of claim 1, wherein at least one of the threshing surfaces has a surface texture including a plurality of raised protuberances, each of the protuberances having a surface facing in a plurality of directions for deflecting tailings propelled thereagainst in a generally random turbulent manner.

3. The threshing plate of claim 2 wherein the raised protuberances are located at spaced locations on the threshing surface.

4. The threshing plate of claim 1, wherein the threshing surface has a surface texture comprising a layer of surface portions facing in a plurality of directions for deflecting the tailings in the turbulent manner.

5. The threshing plate of claim 1, wherein the threshing surface includes small elements thereon having randomly facing surfaces and sharp edges for deflecting the tailings in a random manner therefrom.

6. The threshing plate of claim 1, wherein the threshing surface includes a plurality of raised weld beads at spaced locations thereon for deflecting the tailings into the flow of the tailings in a random manner.

7. Threshing apparatus for a tailings conveyor of an agricultural combine, comprising:
    an impeller mounted for rotation in a housing of the conveyor having radial outer threshing portions that circumscribe an arc when rotated; and
    a threshing plate removably mounted in the housing in predetermined relation to the impeller, the threshing plate including two threshing surfaces on opposite sides thereof, the two threshing surfaces having at least one surface texture affixed thereon, the at least one surface texture including non-bladed, non-cutting surface portions, the threshing plate being flexible so as to be mountable in the housing with a selected one of the two threshing surfaces facing the impeller, at least one of the two threshing surfaces having a generally curved shape marginally larger than the arc and located generally radially outwardly thereof such that when the impeller is rotated the tailings will be propelled by the threshing portions thereof against and along the threshing surface so as to be deflected thereby in a turbulent manner so as to be at least partially threshed by collisions between the tailings and with surfaces in the housing, wherein a first of the threshing surfaces has a surface texture for deflecting the tailings in a first turbulent manner and a second of the threshing surfaces has a surface texture for deflecting the tailings in a second turbulent manner different from the first turbulent manner.

8. Threshing apparatus of claim 7, wherein at least one of the threshing surfaces has at least one raised protuberance thereon in a position for deflecting the tailings away from the surface in the turbulent manner.

9. Threshing apparatus of claim 8, wherein the at least one of the threshing surfaces has a plurality of the raised protuberances at spaced locations thereon for deflecting the tailings in the turbulent manner.

10. A threshing plate mountable in a housing of a tailings conveyor of an agricultural combine along a path of tailings flow through the housing, the tailings conveyor including a rotatable impeller located in the housing for propelling the tailings along the path, the impeller having a plurality of threshing portions which circumscribe an arc when the impeller is rotated, the threshing plate comprising:
    a mounting portion removably mountable to the housing; and
    two threshing surfaces supported by the mounting portion on opposite sides thereof, at least one of the two threshing surfaces having a surface texture affixed thereon, the at least one surface texture including non-bladed, non-cutting surface portions, at least one of the two threshing surfaces being in predetermined relation to the path, at least one of the two threshing surfaces having a generally arcuate shape marginally larger in diameter than the arc circumscribed by the impeller and being located radially outwardly of the arc when positioned in the predetermined relation to the path, the threshing plate being flexible such that the mounting portion can be mounted to the housing with a selected one of the threshing surfaces having the arcuate shape, such that when the impeller is rotated the threshing portions will propel at least a portion of the flow of the tailings against one of the two threshing surfaces so as to be deflected thereby in a turbulent manner so as to collide with others of the tailings and surfaces in the housing so as to be threshed thereby, wherein a first of the threshing surfaces has a smooth surface texture for deflecting the tailings in a first turbulent manner and a second of the threshing surfaces has a rough surface texture for deflecting the tailings in a second turbulent manner different from the first turbulent manner.

11. The threshing plate of claim 10, wherein at least one of the threshing surfaces has at least one raised protuberance thereon in a position for deflecting tailings propelled thereagainst.

12. The threshing plate of claim 10 wherein the at least one of the threshing surfaces has a plurality of the raised protuberances at spaced locations thereon.

13. The threshing plate of claim 10, wherein the threshing surface has a surface texture comprising a layer of beads.

14. The threshing plate of claim 10, wherein the threshing surface has a surface texture comprising a plurality of randomly facing surface portions for deflecting the tailings in random directions from the surface.

15. The threshing plate of claim 10, wherein the threshing surface includes a coating having a surface texture deflecting the tailings in a variety of directions therefrom.

16. The threshing plate of claim 10, wherein the threshing surface is a cast surface having a surface texture deflecting the tailings in a variety of directions therefrom.

17. The threshing plate of claim 10, wherein the threshing surface is a metal surface having a surface texture machined thereon for deflecting the tailings in a variety of directions therefrom.

* * * * *